Patented Mar. 14, 1939

2,150,425

UNITED STATES PATENT OFFICE 2,150,425

ACCELERATORS OF VULCANIZATION

Howard I. Cramer, Cuyahoga Falls, Ohio, assignor to Wingfoot Corporation, Wilmington, Del., a corporation of Delaware No Drawing. Application November 5, 1934, Serial No. 751,593

3 Claims. (Cl. 18—53)

This invention relates to the treatment of rubber and similar vulcanizable materials and particularly to the vulcanization of the same in the presence of a carbon bisulphide derivative of an amine containing a hydrogenated furane ring as an accelerator of the rate of vulcanization.

An object of the invention is to provide a new class of accelerators. Another object is to provide a process of vulcanizing rubber in the presence of a material of the type mentioned whereby improved physical properties will be attained in the resulting vulcanized product. Other objects and advantages will become apparent as the description of the invention proceeds.

The invention comprises vulcanizing a vulcanizable rubber composition in the presence of a compound illustrated by the formula

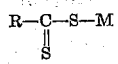

M representing metal, ammonium, substituted ammonium, dinitro aryl, aryl methylene, the group

or the group

and R in all instances representing a tertiary nitrogen atom having attached thereto two organic radicals at least one of which comprises a hydrogenated furane ring. Exemplary of such materials are (1) the metal salts of secondary hydrogenated furfuryl dithiocarbamates such as, for example, zinc ethyl tetrahydro alpha furfuryl dithiocarbamate having the formula:

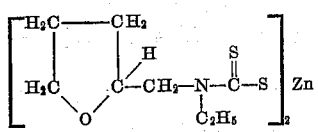

(2) The ammonium salts such as, for example, di(tetrahydro alpha furfuryl) ammonium di(tetrahydro alpha furfuryl) dithiocarbamate having the formula:

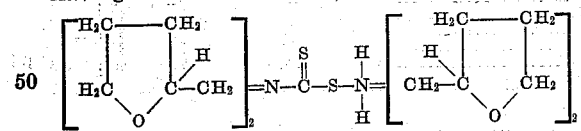

(3) The thiuram disulphides such as, for example, di butyl di(tetrahydro alpha furfuryl) thiuram disulphide having the formula:

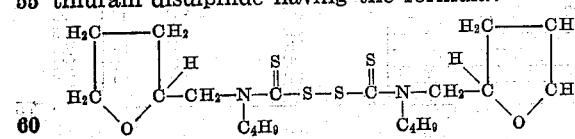

(4) The thiuram mono sulphides, such as, for example, tetra (tetrahydro alpha furfuryl) thiuram mono sulphide having the formula

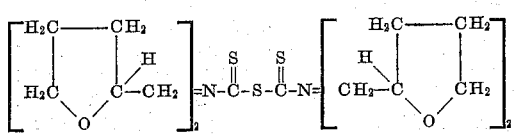

Others are dinitro phenyl di(tetrahydro alpha furfuryl) dithiocarbamate and phenyl methylene (benzal) bis di(tetrahydro alpha furfuryl) dithiocarbamate.

The methods of preparation of these new dithiocarbamic acid derivatives of secondary amines containing a hydrogenated furane ring are similar to those employed for known dithiocarbamic acid derivatives. Thus, the substituted ammonium salts may be prepared by treating two mols of the desired secondary amine containing at least one hydrogenated furane ring with one mol of carbon disulphide in an inert solvent, such as gasoline or petroleum ether, from which the salts readily precipitate. The metallic salts are preferably prepared by the addition of a soluble salt of a metal to an aqueous solution of the sodium dithiocarbamate, the latter being prepared by treating one mol of the secondary amine containing at least one hydrogenated furane ring with one mol of carbon disulphide and one mol of sodium hydroxide in aqueous solution. The thiuram disulphide may be conveniently prepared by the oxidation of the sodium salt of the dithiocarbamate in aqueous solution with ammonium persulphate. The thiuram mono sulphide may be prepared from the thiuram disulphide by desulphurizing the latter by treating it in alcohol solution with one mol of potassium cyanide. The dinitrophenyl esters are prepared by adding to a molar quantity of the sodium dithiocarbamate in alcohol or water one mol of dinitro chlor benzene in warm alcohol. The phenyl methylene (benzal) derivative is prepared similarly by reacting the sodium dithiocarbamate with benzal chloride and heating the mixture to 60–70° C. for a short time.

The secondary amines containing a hydrogenated furane ring of the invention are generally and most easily prepared by hydrogenation processes and are those amines in which the double bonds of the furane ring are saturated, wholly or partially. While the secondary tetrahydro furfuryl amines are the preferred class of amines of the invention, it will be understood that the invention extends to the partially saturated amines such as the dihydro furyl amines which, while not generally preparable by hydrogenation processes, may be obtained by synthesis. For the purposes of simplicity the term "secondary amines containing a hydrogenated furane ring" is used herein to include those secondary amines containing a fully or partially saturated furane ring, however prepared.

The secondary amines containing a hydrogenated furane ring applicable in the practice of the invention may be represented by the type formula

wherein R' is a group containing a hydrogenated furane ring, such as, for example, the tetrahydro alpha furfuryl group; and R'' is a monovalent organic radical such as alkyl, alicyclic, furyl, tetrahydro alpha furyl or aralkyl groups. In general, any secondary amine containing a hydrogenated furane ring and in which aliphatic characteristics predominate may be employed in the practice of the invention.

Illustrative of the secondary amines containing a hydrogenated furane ring are di tetrahydro alpha- and beta- furfuryl amines, N-tetrahydro alpha furfuryl alpha furfuryl amine, N-ethyl tetrahydro alpha- and beta- furfuryl amines, N-cyclohexyl tetrahydro alpha- and beta- furfuryl amines, N-benzyl tetrahydro alpha- and beta- furfuryl amines, di tetrahydro alpha- and beta- furyl amines, di(2-tetrahydro, alpha or beta, furyl ethyl) amines, N-methyl tetrahydro alpha furfuryl amine, N-ethyl tetrahydro alpha furyl amine, N-isobutyl tetrahydro alpha furfuryl amine, N-isoamyl tetrahydro alpha furfuryl amine, N-n-butyl tetrahydro alpha furfuryl amine, N-beta phenyl ethylene tetrahydro alpha furfuryl amine, and the N-hexahydro tolyl tetrahydro alpha- and beta- furfuryl amines.

Further exemplary of the invention are the following tables describing the properties of illustrative examples. Table I gives the melting points, if a solid compound, and the colors of the compounds. Table II gives the nitrogen, sulphur and metal, if any, contents for the compounds as compared with the theoretical percentages.

Further illustrative of these new dithiocarbamates and thiuram sulphides are potassium di(tetrahydro alpha furfuryl) dithiocarbamate, penta methylene ammonium tetrahydro alpha furfuryl dithiocarbamate, ammonium N-cyclohexyl tetrahydro alpha furfuryl dithiocarbamate, zinc benzyl tetrahydro alpha furfuryl dithiocarbamate, lead ethyl tetrahydro alpha furfuryl dithiocarbamate, iso butyl tetrahydro alpha furfuryl ammonium isobutyl tetrahydro alpha furfuryl dithiocarbamate, ammonium n-propyl tetrahydro alpha furfuryl dithiocarbamate, zinc iso amyl tetrahydro alpha furfuryl dithiocarbamate, and sodium beta phenyl ethylene tetrahydro furfuryl dithiocarbamate. Others are morpholyl di(tetrahydro alpha furfuryl) thiuram di- and mono-sulphides, dicyclo hexyl di(tetrahydro alpha furfuryl) thiuram di- and mono-sulphides, diethyl di(tetrahydro alpha furfuryl) thiuram di- and mono- sulphides, dibenzyl ditetrahydro alpha furfuryl thiuram di- and mono- sulphides, dimethyl di(tetrahydro alpha furfuryl) thiuram di- and mono-sulphides, di hexahydro tolyl di(tetrahydro alpha furfuryl) thiuram di- and mono- sulphides, and di(alpha furfuryl) di(tetrahydro alpha furfuryl) thiuram di- and mono-sulphides.

Conveniently any of these new accelerators or a mixture thereof may be added to any of the ordinary rubber mixes in an amount which may be determined according to the usual methods. It has been found for example that the compounds of the present invention are excellent accelerators in a rubber composition of the following formula:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Samples of the compounded rubber made up in accordance with this formula were subjected to vulcanization by steam heat in a mold after which they were subjected to physical tests to ascertain their elasticity and tensile strength.

The results of these tests are given in the following table:

*Table I*

| | Compound | Melting point, °C. | Color |
|---|---|---|---|
| 1 | Di(tetrahydro alpha furfuryl) ammonium di(tetrahydro alpha furfuryl) dithiocarbamate | 107-8 | White. |
| 2 | Zinc di(tetrahydro alpha furfuryl) dithiocarbamate | 154-6 | Do. |
| 3 | Lead di(tetrahydro alpha furfuryl) dithiocarbamate | 124-6 | Buff. |
| 4 | Tetra (tetrahydro alpha furfuryl) thiuram disulphide | Oil | Red-brown. |
| 5 | Tetra (tetrahydro alpha furfuryl) thiuram mono sulphide. | Oil | Red. |

*Table II*

| Compound | Analyses in percent | | | | | |
|---|---|---|---|---|---|---|
| | Found | | | Calculated | | |
| | Nitrogen | Sulphur | Metal | Nitrogen | Sulphur | Metal |
| 1 | 6.26 | 14.54 | | 6.27 | 13.71 | |
| 2 | 4.80 | 21.90 | 12.71 | 4.77 | 21.86 | 11.15 |
| 3 | 3.81 | 17.25 | 29.51 | 3.85 | 17.67 | 28.45 |
| 4 | 5.36 | 24.65 | | 5.38 | 24.63 | |
| 5 | 5.93 | 18.87 | | 5.74 | 19.71 | |

*Di(tetrahydro alpha furfuryl) ammonium di(tetrahydro alpha furfuryl) dithiocarbamate*

| Cure in mins., °F. | Ult. tensile in kgs/cm.² | Max. elong. in percent | Modulus in kgs/cm.² | |
|---|---|---|---|---|
| | | | 500% | 700% |
| 10/260 | 113 | 810 | 19 | 60 |
| 15 | 142 | 780 | 25 | 85 |
| 20 | 119 | 685 | 33 | |
| 30 | 171 | 740 | 36 | 134 |
| 40 | 164 | 710 | 40 | 155 |

*Zinc di(tetrahydro alpha furfuryl) dithiocarbamate*

| 10/260 | 108 | 800 | 17 | 59 |
|---|---|---|---|---|
| 15 | 135 | 760 | 25 | 95 |
| 20 | 144 | 740 | 28 | 109 |
| 30 | 136 | 710 | 32 | 122 |
| 40 | 154 | 765 | 29 | 102 |

Lead di(tetrahydro alpha furfuryl) dithiocarbamate

| Cure in mins., °F. | Ult. tensile in kgs/cm.² | Max. elong. in percent | Modulus in kgs/cm.² | |
|---|---|---|---|---|
| | | | 500% | 700% |
| 10/260 | 104 | 770 | 19 | 65 |
| 15 | 120 | 740 | 24 | 93 |
| 20 | 145 | 750 | 28 | 106 |
| 30 | 118 | 670 | 37 | |
| 40 | 107 | 670 | 34 | |

Tetra (tetrahydro alpha furfuryl) thiuram disulphide

| Cure in mins., °F. | Ult. tensile in kgs/cm.² | Max. elong. in percent | 500% | 700% |
|---|---|---|---|---|
| 15/260 | No cure | | | |
| 20 | No cure | | | |
| 25 | 146 | 750 | 27 | 102 |
| 30 | 170 | 720 | 38 | 152 |
| 35 | 178 | 700 | 44 | 174 |

Tetra (tetrahydro alpha furfuryl) thiuram mono sulphide

| Cure in mins., °F. | Ult. tensile in kgs/cm.² | Max. elong. in percent | 500% | 700% |
|---|---|---|---|---|
| 10/260 | No cure | | | |
| 15 | 108 | 880 | 14 | 42 |
| 20 | 110 | 820 | 17 | 56 |
| 30 | 120 | 750 | 24 | 89 |
| 40 | 143 | 765 | 36 | 95 |
| 60 | 142 | 750 | 30 | 106 |

It will be apparent from the preceding tables that the use of these compounds results in excellent cures at comparatively low temperatures, the vulcanized products having excellent physical qualities both in regard to physical strength and elongation.

It will be understood that by the term "rubber" is meant any of the ordinary forms of rubber such as latex, balata, reclaimed rubber, gutta percha, and the ordinary coagulated forms of *Hevea brasiliensis* tree. It is intended that the patent shall cover, by suitable expression in the appended claims, whatever features of patentable novelty reside in the invention.

What I claim is:

1. The process of treating rubber which comprises subjecting it to vulcanization in the presence of tetra (tetrahydro alpha furfuryl) thiuram disulphide.

2. The process of treating rubber which comprises subjecting it to vulcanization in the presence of a thiuram sulphide having attached to each of the nitrogen atoms two radicals each of which is a radical selected from the group consisting of tetrahydro furyl, tetrahydro furfuryl and beta tetrahydro furyl ethyl radicals.

3. The process of treating rubber which comprises subjecting it to vulcanization in the presence of a tetra (tetrahydro alpha furfuryl) thiuram sulphide.

HOWARD I. CRAMER.

CERTIFICATE OF CORRECTION.

Patent No. 2,150,425.  March 14, 1939.

HOWARD I. CRAMER.

It is hereby certified that error appears in the printed specification of the above numbered patent requiring correction as follows: Page 2, first column, line 16, for "furyl" read furfuryl; and that the said Letters Patent should be read with this correction thereir that the same may conform to the record of the case in the Patent Office.

Signed and sealed this 16th day of May, A. D. 1939.

Henry Van Arsdale
Acting Commissioner of Patents.

(Seal)